Patented Apr. 29, 1930

1,756,550

UNITED STATES PATENT OFFICE

OSWALD H. HANSEN, OF CEDARBURG, WISCONSIN, ASSIGNOR TO HANSEN CANNING MACHINERY CORPORATION, OF CEDARBURG, WISCONSIN, A CORPORATION OF WISCONSIN

PROCESS OF STERILIZING FOOD

No Drawing. Application filed June 15, 1929. Serial No. 371,304.

The present invention relates in general to improvements in the art of heat treating edible substances having certain characteristics, in order to sterilize and to permanently preserve the same by destroying bacteria and other harmful micro-organisms therein.

An object of the invention is to provide an improved process of rapidly and effectively sterilizing certain kinds of food products, and of permanently maintaining the treated substances in sterile condition.

As a result of the more recent introduction of high speed canning machinery with its resultant enormous capacity, the matter of effectively sterilizing the vast output of the modern filling and closing mechanisms, becomes an important problem requiring careful consideration. In order to avoid limitation of the capacity of the canning factory as a unit, the sterilizing and other processing operations must keep pace with the rapid functioning of the measuring, filling and closing machinery. The degree of sterilization of the product, must however be sufficient to insure complete destruction of all of the bacteria, and the treated material must be finally packed in the containers under sterile conditions in order to maintain the commodity free from subsequent spoilage.

Certain classes of food products such as strawberries, raspberries, and the like will not readily withstand being subjected to their sterilizing temperature for any great length of time, without seriously degrading the quality thereof. Many of these products moreover have normally sterile cores, all of the destructive bacteria being confined to the outer portions of the granules, thereby making complete penetration of the granules or berries, with sterilizing heat, unnecessary.

In order to avoid degradation of such products, they should be sterilized as quickly as possible, and the sterilized granules should preferably be maintained submerged in a sterile liquid in order to permanently preserve the same. If the submerging liquid is applied while cold and the entire mass of mixture is subsequently heated up to the sterilizing temperature, the heat penetration is too slow, and too long a time is required to effect the treatment. The heating required to penetrate a relatively thick mass of the mixture, may also be sufficient to burn or otherwise damage the granules nearest to the source of heat. Due to the relatively frail nature of the cells of such commodities, the granules or berries must not be violently heated because such treatment will also result in deterioration of the product.

The present invention contemplates provision of an improved method of rapidly and effectively sterilizing commodities possessing the foregoing characteristics, without in any manner degrading the product, by utilizing heated liquid for the purpose of simultaneously sterilizing the granules and protecting them against spoilage.

In accordance with the present improvement, the preserving liquid is first sterilized and allowed to cool to any desired temperature. The sterile liquid while still in sufficiently heated condition to insure complete and effective sterilization of the granules of the particular commodity being treated, is then applied so as to fill the voids of the granular material. The heat confined in the liquid thus applied, quickly and thoroughly sterilizes each of the individual granules and prevents subsequent desterilization. As the heat of the preserving liquid is absorbed by the granules or berries, the temperature of the mixture naturally drops very quickly, thereby avoiding deterioration of the berries due to lengthy overheating.

In practicing the improved process, the granular material may be treated either in bulk or in segregated batches. The granular material may if desired, be initially heated to a temperature somewhat below the degrading heat thereof, in order to hasten the subsequent sterilization and to avoid excessive temperature differences. This initial heating may be effected when treating the product in bulk, while the granules which are ordinarily of globular structure, are being rolled gently over a heated surface or plate, in the form of a thin layer, or the heat may be applied to measured batches of the granules after having been placed in the final containers or cans but before closing thereof.

The preserving liquid may be rapidly and thoroughly sterilized by subjecting a constantly advancing film or thin layer thereof, to a source of relatively high heat. After the temperature of the sterilized liquid has been sufficiently reduced to avoid injuring the granules when directly applied, enough of the hot liquid is mixed with the granular material to completely fill all voids and to submerge all of the granules. If the product is being treated in bulk, a constantly advancing stream of mixture may readily be produced by regulating the rate of progression of the berries and the quantity of liquid admitted to the path of travel of the berries. If batch treatment is resorted to, accurately premeasured batches of the preserving liquid may be deposited in the successive containers or cans having therein premeasured batches of the granules. As previously stated, the hot liquid upon coming in contact with the cooler granules, quickly transmits heat thereto and effectively destroys the bacteria therein. This transfer of heat results in a rapid reduction in the temperature of the mixture, below the sterilizing temperature of the granular material. The finally sterilized mixture should then be hermetically sealed in the containers or cans in a sterile atmosphere such as a steam bath, in order to insure permanent preservation of the commodity.

If the material being treated is of the class having a normally sterile core, the liquid may be applied at a lower temperature than when complete penetration at sterilization temperature is necessary, and in every case the temperature of the preserving liquid will be dependent upon the specific characteristics of the substance treated. From the foregoing description, it should be apparent that strawberries and other commodities having similar characteristics, may be rapidly and effectively sterilized and permanently preserved, in accordance with the present improved method, without danger of degrading the quality or appearance of the granular material. The improved process will obviously permit effective heat treatment of such products at a sufficiently rapid rate of speed to keep pace with the high speed fillers and closing machines, and insures thorough sterilization of all portions of each individual batch of material treated.

Although the present improved method is unquestionably applicable with marked advantage to the treatment of various kinds of fruits and other vegetation, it is believed that certain other classes of hardier commodities may be more advantageously treated by another process forming the subject of a copending application S. N. 371,303, filed June 15, 1929.

It should be understood that it is not intended to limit the present invention to the exact steps of the method specifically described herein by way of illustration, for various modifications within the scope of the appended claims may occur to persons skilled in the art.

It is claimed and desired to secure by Letters Patent:—

1. The process of sterilizing, which comprises, admitting to the voids of pre-heated solids a liquid of temperature sufficiently high to completely sterilize the mixture.

2. The process of sterilizing, which comprises, filling the voids of granular pre-heated solids with a sterile liquid of temperature only sufficient to insure complete sterilization of the mixture.

3. The process of sterilizing, which comprises, admitting to the voids of successive measured batches of pre-heated solids alone, batches of liquid of temperature sufficiently high to completely sterilize each batch of mixture.

4. The process of sterilizing, which comprises, filling the voids of successive measured batches of granular pre-heated solids with sterile batches of liquid of temperature only sufficient to insure complete sterilization of each batch of mixture.

5. The process of sterilizing, which comprises, heating granular solids alone to a temperature below the sterilizing temperature thereof, and subsequently completely sterilizing said solids by admitting to the voids thereof sterile liquid having a temperature sufficiently high to effect such complete sterilization.

6. The process of sterilizing, which comprises, heating batches of granular solids alone in succession to temperatures below the sterilizing temperature of the solids, and subsequently admitting to the voids of each batch sufficient liquid of temperature sufficiently high to effect complete sterilization of the batches of mixture.

7. The process of sterilizing, which comprises, filling the voids of granular pre-heated solids with a sterile liquid of temperature sufficiently high to insure complete sterilization of the mixture, and subsequently hermetically sealing the sterilized mixture under sterile conditions.

8. The process of sterilizing, which comprises, admitting to the voids of successive measured batches of pre-heated solids batches of liquid of temperature sufficiently high to completely sterilize each batch of mixture, and subsequently packing the sterile batches in containers under sterile conditions.

9. The process of sterilizing, which comprises, heating granular solids alone to a temperature below the sterilizing temperature thereof, subsequently completely sterilizing said solids by admitting to the voids thereof sterile liquid having a temperature sufficiently high to effect complete sterilization, and finally hermetically sealing the sterilized mixture under sterile conditions.

In testimony whereof, the signature of the inventor is affixed hereto.

OSWALD H. HANSEN.